(12) United States Patent
Meyer

(10) Patent No.: US 7,262,602 B2
(45) Date of Patent: Aug. 28, 2007

(54) ACTIVE GEOPHYSICAL PROSPECTING SYSTEM

(76) Inventor: David Gary Meyer, 11716 Crystal View La., Longmont, CO (US) 80504

( * ) Notice: Subject to any disclaimer, the term of this patent is extended or adjusted under 35 U.S.C. 154(b) by 152 days.

(21) Appl. No.: 11/177,372

(22) Filed: Jul. 8, 2005

(65) Prior Publication Data

US 2007/0007966 A1    Jan. 11, 2007

(51) Int. Cl.
*G01V 3/00* (2006.01)
*G01V 3/16* (2006.01)
*G01S 17/89* (2006.01)

(52) U.S. Cl. .................. 324/337; 324/330; 342/22
(58) Field of Classification Search .............. 324/326, 324/330, 332, 334–337, 344; 342/22
See application file for complete search history.

(56) References Cited

U.S. PATENT DOCUMENTS

| | | | | |
|---|---|---|---|---|
| 2,573,682 | A | * 11/1951 | Barret | 324/335 |
| RE24,489 | E | * 6/1958 | Barret | 324/334 |
| 2,901,688 | A | * 8/1959 | Barret | 324/334 |
| 3,500,175 | A | 3/1970 | Ronka | |
| 3,617,866 | A | 11/1971 | Dowsett | |
| 3,636,435 | A | 1/1972 | Seigel | |
| 4,746,867 | A | * 5/1988 | Gunton | 324/329 |
| 4,814,711 | A | 3/1989 | Olsen et al. | |
| 5,339,080 | A | 8/1994 | Steinway et al. | |
| 5,673,050 | A | * 9/1997 | Moussally et al. | 342/22 |
| 5,831,576 | A | 11/1998 | Sheynblat | |
| 6,052,333 | A | 4/2000 | Williams | |
| 6,191,587 | B1 | 2/2001 | Fox | |
| 6,360,173 | B1 | 3/2002 | Fullerton | |
| 6,476,608 | B1 | 11/2002 | Dong | |
| 6,603,313 | B1 | 8/2003 | Srnka | |

\* cited by examiner

*Primary Examiner*—Edward Lefkowitz
*Assistant Examiner*—Kenneth J. Whittington
(74) *Attorney, Agent, or Firm*—Meyer + Associates

(57) ABSTRACT

An active system and method for determining the physical characteristics and geological composition of subterranean formations is described. Plane polarized electromagnetic waves at specific frequencies are transmitted by a mobile transmitting antenna held stationary in the far-field about a prospecting point. The plane polarized electromagnetic waves penetrate the Earth and return to the surface to be picked up at a separate mobile receiving antenna held stationary about a prospecting point. The differences in intensity and polarization between transmitted and received waves are measured and carry geological information. Further, a coordinated series of transmissions, receptions, and measurements are made, in which the angle of incidence and the revolution angle about a centerline emanating perpendicularly from the prospecting point are carefully and systematically varied and repeated for a specific set of frequencies. The entire data set is processed to give stratigraphy and geological composition in three-dimensions including, for example, the location of commercially important ore deposits or reservoirs of oil and gas. The transmission time, the reception time, and/or the data window are controlled to minimize the ionospheric effect. The method seeks the steady, repeatable part of a received signature and changes in the received signal for two or more identical probing transmissions are filtered out, as unwanted noise. The system employs a frequency/time duality for not resolving deep features to the same detail as shallow features.

35 Claims, 9 Drawing Sheets

RC Helicopter Pairs Carry Transmit and Receive Equipment.

Plane-Wave Behavior at Boundary Between Two Media

Plane-Wave Reflects off Subterranean Interface

Plane-Wave Interacts with Two Subterranean Interfaces

Plane-Waves of Differing Frequencies Interacts with Two Subterranean Interfaces

Polarization States of a Plane-Wave Incident on a Media Boundary
($s$-polarization ($\perp$ to plane-of-incidence) and $p$-polarization ( $\parallel$ to plane-of-incidence))

Resonant Cavity Formed by Earth and Ionosphere

Two RC Helicopters Configured to Position and Feed Transmitting Antenna

RC Helicopter Pairs Carry Transmit and Receive Equipment.

ACTIVE GEOPHYSICAL PROSPECTING SYSTEM

BACKGROUND

The present invention relates to active geophysical exploration. It has long been known that there are substantial electromagnetic fields associated with the Earth. The origin of these electromagnetic fields is unclear: one theory holds that low-frequency electromagnetic fields are emitted from beneath the surface of the Earth and radiate outward, such that they can be measured by low frequency methods at the surface. Others postulate that currents are generated by oxidation-reduction type reactions taking place where water and hydrocarbons are present, and that the electromagnetic radiation is caused by interaction of these steady and unsteady currents with the Earth's magnetic field. Still others postulate that the radiation is reflected from outside the Earth's atmosphere.

Irrespective of the source, it is well-documented scientific theory that discontinuities in the subterranean structure of the Earth crust cause reflection and refraction of electromagnetic radiation at interfaces between electrically differing materials. Additionally, the distance a transverse electromagnetic wave travels in a material before being substantially absorbed, is a known function of the frequency of the wave (so-called "skin-depth" expression). Thus, it has been hypothesized that prospecting for hydrocarbons, such as oil, gas and coal, as well as precious metals, could be achieved by mapping the strength of electromagnetic waves at various frequencies which naturally emanate from the Earth providing a passive method of subterranean exploration and prospecting techniques.

Utilizing naturally occurring signals seems plausible, but has proven problematic. Because the emitted wave is so random and its exact source not known, obtaining meaningful signal is an extremely difficult task, if not impossible. In addition, since the source and strength is not known, calibration of instruments is a guess. One almost insurmountable problem with these signals is "noise." That is, there is an extremely low signal-to-noise ratio associated with these low frequency signals, and this high level of noise typically causes interference in detecting those signals that are determinative of geologic formations. For example, even the cycling of the measurement equipment, such as cooling fans, disrupts the signal.

None-the-less, many different passive methods for picking up and determining low frequency electromagnetic waves emanating from the Earth have been proposed. By utilizing an antenna to pick up these naturally occurring frequencies emanating from the Earth's surface, theoretically one can filter, amplify, modify and otherwise process these signals to turn them into a readable signal. Various low pass and high pass filtering techniques have been proposed, and in some cases employed, after the initial amplification of the signal to improve the quality of the signal. This amplification and filtering is known as "conditioning" and/or "pre-conditioning" of the signal and is generally considered to be the most common technique for identifying naturally occurring electromagnetic signals emanating from the Earth.

Many attempts to electronically solve these problems have met with only limited success. For example, U.S. Pat. No. 6,414,492 discloses a system for passively determining physical characteristics of subterranean geological formation that includes an antenna for acquiring low frequency signals naturally emanating from the Earth which signals are first put through a low pass filter and buffer and then converted from analog to digital, stored in a memory buffer, converted to a frequency spectrum by a Fourier transform, and then further processed to display geophysical information versus the depth of such discontinuities.

Unfortunately, irrespective of the methods employed to improve the quality of the signals from passive systems, problems remain with the signal. Signal-to-noise ratios, as well as the randomness of the electromagnetic wave source remain problematic and impede, if not totally prohibit reproducibility. In order to overcome these problems, active methods have been suggested. Well known active methods for determining geologic subterranean surfaces involve seismic methods wherein pre-programmed charges are detonated, sending a mechanical wave through the area to be mapped. These seismic systems do not employ electromagnetic energy. The "mechanical" seismic waves are received with sensitive seismic meters to locate and identify subterranean geologic formations. This methodology employs the concept that discontinuities in subterranean structure reflect mechanical waves, and that different wave frequencies propagate differently in the Earth. The distinguishing features of the seismic method (as with all active methods) is that the original probing signal is generated, and therefore of a known intensity and characterization.

The seismic refraction method is based on the measurement of the travel time of seismic waves refracted at the interfaces between subsurface layers of different velocity. Seismic energy is provided by a source ("shot") located on the surface. Energy radiates out from the shot point, either traveling directly through the upper layer (direct arrivals), or traveling down to and then laterally along higher velocity layers (refracted arrivals) before returning to the surface. This energy is detected on the surface using a linear array of geophones. Observation of the travel-times of the refracted signals provides information on the depth profile of the refractor.

Use of mechanical wave propagation in a solid media, however, leads to a whole different set of problems. The problem with seismic waves is their propagation patterns within the media-Earth. Being mechanical waves, they have two propagation modes—transversal and compressional. These modes can mix at the boundaries between media resulting in a shear wave making the interpretation of the resulting data extremely difficult. Electromagnetic waves do not have these two propagation modes and, therefore, the signal is "cleaner". The meaningfulness of the detected seismic signal is reduced by seismic noise as the sound waves bounce around inside the Earth, some canceling and other amplifying.

It would, therefore, be advantageous to have an active electromagnetic wave system that could produce reliable, reproducible data. However, prior art systems have not, to-date, been effective in accomplishing this for a myriad of reasons. One set of methods as illustrated by U.S. Pat. No. 3,636,435 falls into the, so-called, "Induced Polarization" (IP) class of prospecting methods. In accordance with this method, a large transmitting "loop" conductor is laid directly on the ground and fixed in this position while data is being taken. An alternating current is induced in the loop to generate an electromagnetic field. The inductive fields generated induce eddy currents in the Earth and these eddy currents create secondary fields that radiate in all directions to interact with all profiled obstacles, as well as the Ionosphere, i.e. the field radiates up, down and all around. A detecting loop (or pair of loops, etc.) is moved around and/or multiple detecting loops are positioned and held fixed. In either case, changes in the inductive field intensity as a function of position (so-called "gradients") are recorded. The "Polarization" in IP refers to spatial separation of charged particles in the environment, and not to the vector direction of the electromagnetic fields.

The inherent problems with the IP-class methods are numerous. As the generating loop is near the ground, it is well known that the interaction with the ground is primarily "magnetic induction" and not electromagnetic waves, creating a near field effect. The near field effect is characterized as a region of space close enough to a transmitting antenna so that the strength of the induction field is larger than strength of the radiation field. As is well known, the radiation fields are those electric and magnetic fields that decay as 1/r (where r is the distance from the geodetic center of the antenna) and that collectively carry energy away from the source; while, induction fields are those electric and magnetic fields that decay as $1/r^2$ and that collectively carry no energy away from the source.

Also, the art generally requires the generating loop, the Earth, and the receiving loop (or loops) all to reach steady-state, meaning that a relatively long time elapses (~10 seconds) before data is taken. This transmission/reception time allows the generated energy to interact with unintended and interfering objects, including the Ionosphere. The recorded data from these unintended objects is meaningless for the intended purpose and creates undistinguishable interfering signals, i.e. it is generated noise. First, as the Ionosphere is randomly and chaotically changing, this interaction "scrambles" the reflected data. Second, no precise orientation or shape of the generating or receiving loops is maintained. If the field strengths at multiple IP ground receiving loops are differenced, the resulting measurements are basically identical to those obtained via the so-called resistivity sounding prospecting methods.

Another set of active electromagnetic prospecting methods, as illustrated by U.S. Pat. No. 3,500,175, or U.S. Pat. No. 3,617,866, are referred to as Radio Frequency Surveys (RFS's). In these methods, a continuous-wave transmitter (either one actively constructed as part of the apparatus or a "convenient" radio frequency transmitter known to already be in the area) is activated. The transmitter "lights up" the Earth-Ionosphere waveguide. A receiving antenna is moved across the surface region of interest (by human, motor vehicle, or airplane) and the resulting field intensities are recorded as a function of position.

In some methods in this class, where the transmitter is under the control of the person versed in the art, the relative phase between transmitted and received field is also recorded. The data set of interest is the change in received information as a function of changes in the position of the receiving antenna. The precise orientation of the receiver and transmitter is not controlled (except to aid in gathering time-delay (phase) information). Practitioners of RFS typically claim the readings produced indicate something about subsurface conductivities and the method is disclosed and practiced as being at a single, convenient frequency. Again, the interference and uncertainty of the random reflective, verses the emitted signal without time delay, makes the gathered information suspect and impossible of accurate interpretation.

A third broad class of electromagnetic prospecting methods falls into the Ground Penetrating Radar (GPR) class of methods as illustrated by U.S. Pat. No. 5,339,080. As practiced and disclosed, GPR is typically a pulsed method, at a single frequency eliminating ionospheric interference. However, in order to eliminate interaction between the ground and the inductive fields, GPR operates in the meter to centimeter wave region of the electromagnetic spectrum (approximately 100 MHz to 500 MHz). At these wavelengths, the transmitter can be only a few feet above the ground, yet the ground can still be in the far-field. Unfortunately, at these wavelengths, GPR can only "see" into the ground about 10-30 meters at the most (penetration, or skin-depth is a function of frequency). Moreover, GPR, like virtually all radar systems, makes only a field intensity measurement and generally operates at normal incidence (angle of incidence is 90°) to the Earth surface; therefore, no information on the polarization of the fields is measured or can be meaningful. Most GPRs are designed to transmit and receive only at a single fixed frequency.

In both the IP class and the RFS class of methods, there has been recent attention paid to "pulsed" transmission as illustrated in U.S. Pat. Nos. 5,498,958 or 5,796,253. In exemplary disclosures of pulsed methods to-date, the pulsed nature of the transmission is to facilitate attempting to view the "decay" characteristics of the received field intensity. In accordance with this practice, purportedly, the decay characteristics contain intelligible information about the location of buried conductors. Again, the pulsing is not carried out in a way that will limit interaction with the Ionosphere which randomly scrambles the received signal and is interfering (noise.) None of these methods allow the reconstruction of strata thicknesses and composition to produce a three-dimensional display (topology) of the subterranean landscape.

It will be realized that the foregoing discussion and examples of the related art and the scope of the illustrations related thereto are set forth as background only. Their intent is to be exemplary and illustrative of problems related to the art, as well as prior attempts to address these problems, at least in part. They are not, nor are they intended to be exclusive or exhaustive. Nor are they intended, in any manner, to be read as a limitation of the instant disclosure or the appended claims.

SUMMARY

The following embodiments and aspects thereof are described and illustrated in conjunction with systems, devices and methods which are meant to be exemplary and illustrative, not limiting in scope. In various embodiments, one or more of the above-described problems have been reduced or eliminated, while other embodiments are directed to other improvements.

In accordance with the instant system and method, subsurface strata thicknesses and chemical compositions associated with changes in intensity and polarization of electromagnetic waves which are transmitted and received from an elevated, spatial antenna system, specifically oriented and positioned, relative to a specific point on the earth surface are mapped to yield a three-dimensional topology (stratigraphy) and geology (geological layer composition) of subterranean formations. Plane-polarized ("s" and "p") electromagnetic waves of varying, specific frequencies, and in one embodiment, specific duration, to minimize ionospheric effects, are emitted by a movable transmitting antenna held substantially stationary at an Incidence Station during a Read Cycle.

The plane electromagnetic polarized waves of these varying frequencies are transmitted into the Earth's surface to a depth, dependent on the designated frequency, in a layered fashion. The transmitted, polarized electromagnetic waves, which interact with subterranean formations at a specific depth, that are not absorbed, return to the surface by reflection to be received by a separate stationary receive antenna positioned at the Incidence Station. The differences between the transmitted and received wave carry geological information which is manipulated to map subterranean topology and identify geologic composition of the layers.

The antenna system is, advantageously, a line antenna system comprising a transmit line antenna and a receive antenna, each separately suspended between two aerial platforms, which are movable, but capable of hovering for substantial periods. Thus, the platforms are mobile in three-dimension, but posses the ability to remain relatively motionless during a Read Cycle. The ionospheric effect is mitigated by regulating the transmit duration, and/or the receive duration and/or data manipulation as a function of a transmission timeline.

In operation, parametric information is identified which includes, for example, a set of prospecting frequencies, as well as angles of incidence or incremental variations of the angles of incidence which may include specific start and termination boundaries. The angles of reflection are set to automatically mirror the specified criteria for the angles of incidence. The angles of revolution are likewise specified around the Centerline. At a particular Incidence Station, the transmit antenna is rotated in a plane perpendicular to the transmit propagation line, which is a line connecting the geodetic center of the transmit antenna with the Prospecting Point, to effect "s" and "p" polarizations. In each configuration, n polarized pulses are transmitted (wherein n is equal to or greater than two).

The receive antenna is rotated in a plane perpendicular to the receive propagation line which is a line connecting the geodetic center of the transmit antenna with the Prospecting Point n times during a Read Cycle. Thus, for each transmitted sequence of n identical electromagnetic wave pulses, of specific far-field polarization, sent from the transmit antenna, the receive antenna is rotated within plane to a sufficient number of positions to ascertain the polarization state of the received signal. By revolving the transmitting and receiving antennas, in a given relationship to each other and the Prospecting Point, in increments, 360° about the Centerline as well as varying the angle of incidence, and thus reflection, and emitting and receiving over the range of prospecting frequencies for each Read Cycle, as the process is repeated, a three-dimensional map of the subterranean geology, including composition, can be generated.

In addition to the summary of exemplary aspects and embodiments described above, further aspects and embodiments will become apparent to the skilled artisan by reference to the drawings and by study of the following descriptions all of which are within, without limitation, the scope of the claims.

BRIEF DESCRIPTION OF THE FIGURES

Exemplary embodiments are illustrated in referenced figures of the drawings. It is intended that the embodiments and figures disclosed herein are to be considered illustrative and exemplary only and not limiting. The features and advantages of the present invention, without limitation, are hereinafter described in the following detailed description of exemplary embodiments to be read in conjunction with the accompanying drawing figures and will be apparent to one skilled in the art that other embodiments are included, in view of the following, wherein like reference numerals are used to identify the same or similar parts in the similar views in which.

DISCUSSION OF THE SYSTEM NOMENCLATURE

Figure 1:
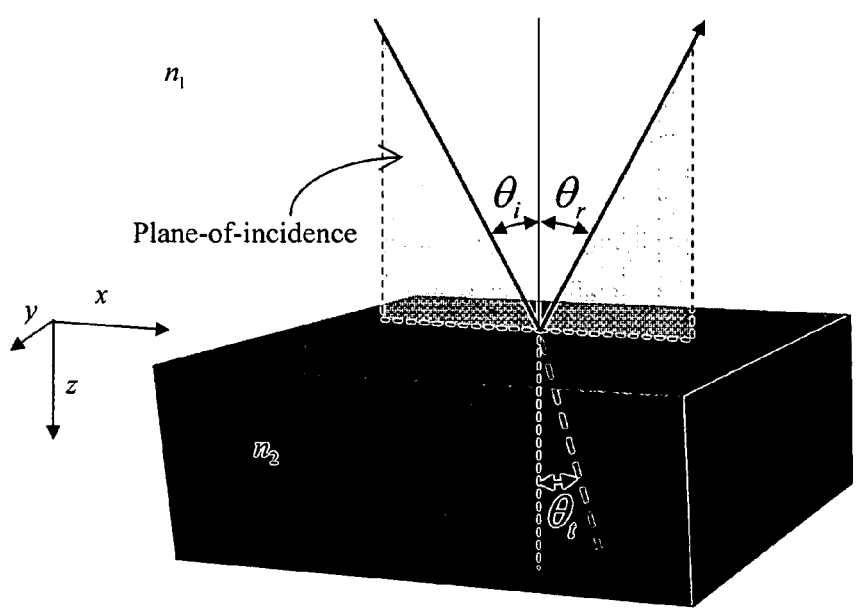
FIG. 1 depicts a plane wave behavior at boundary between two media.

As used herein, the following terms are meant to have the meanings hereinafter set forth.

Centerline shall mean a line emanating from the Prospecting Point orthogonal to the Earth's surface.

Incidence Station shall mean a configuration of the transmit antenna and receive antenna wherein the transmit antenna is in the far-field of the Prospecting Point, such that the angle of incidence and the angle of reflection are equal and held at a pre-specified value and the revolution angle about the Centerline is fixed.

Prospecting Point shall mean a predetermined point on the Earth's surface from which the Centerline emanates.

Read Cycle shall mean n predetermined, finite periods of time during which n (wherein n is two or greater) identical electromagnetic wave pulses of specific polarizations at a specified frequency, $\omega$, are emitted from the transmit antenna; and, each reflected wave pulse is received by the receive antenna in at least two different orientations within a plane orthogonal to the receive propagation line.

Read Cycle Data Record shall mean the signal (data) recorded at the receive antenna during one Read Cycle.

DETAILED DESCRIPTION OF EXEMPLARY EMBODIMENTS

The present system may be described herein in terms of functional block components and various processing steps. It should be appreciated that such functional blocks may be realized by any number of hardware and/or software components configured to perform the specified functions. For example, the system may employ various integrated circuit, aerodynamic, or optical components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java or the like.

The system, and method, is active (a probing signal is transmitted), using electromagnetic waves wherein the transmitted electromagnetic waves are of two distinct far-field plane polarizations (called "s" and "p" polarizations). Polarization of an electromagnetic field is the orientation, relative to a fixed coordinate system in space, of the electric field vector. For each Read Cycle, n predetermined, finite periods of time during which n (wherein n is two or greater) identical electromagnetic wave pulses of specific polarizations at a specified frequency, are emitted from the transmit antenna while the antenna is fixed; and, each reflected wave pulse is received by the receive antenna in at least two different orientations within a plane orthogonal to the receive propagation line. The reflected intensity and reflected polarization for both "s" and "p" transmit polarizations is hence measured over a range of frequencies, at various angles (incident angles) relative to the Prospecting Point, at incremental angles of revolution about the Centerline. Ionospheric effects are accounted for by signal and/or data manipulation as a function of time. Specifically, the signal transmission time and/or the signal reception and/or the off-line processing of the data is controlled as will be further explained below.

In operation, the prospecting run is advantageously scripted about one or more Prospecting Points. A first Incidence Station is thus specified, and the antenna system caused to come on station. Once on station, the antenna system is held substantially stationary, while a Read Cycle is initiated. The receive antenna rotates in-plane so that the polarization state of the received pulse is ascertained. Advantageously, the prospecting frequencies are then varied and the antenna system is moved to a new Incidence Station, as scripted, and initiates a new Read Cycle. The system and method focus on repeatable data and exclude non-repeatable data, as noise. The received data can then be mapped, based upon known empirical calibrations, to yield both subterranean stratigraphy and related compositional information, such as the presence of oil, or metal ore, such as gold or uranium. In one aspect, the system adapts to frequency/time duality mandated mathematically from using finite duration probing signals in not resolving deep features (which require longer wavelengths) to the same detail that it resolves shallow features.

The system includes a set of antennas, comprising at least one transmit antenna and at least one receive antenna, located in relation to one another and the Prospecting Point. The transmit antenna and the receive antenna are formed of a continuous conductor or collection of continuous conductors. An imaginary line between the geodetic center (a point on a body, such as an antenna, that minimizes the maximum distance to any other point on that body) of the transmit antenna and the Prospecting Point forms a "transmit propagation line" to define an angle with the ground at the Prospecting Point. This angle is the angle of incidence. Likewise, an imaginary line between the geodetic center of the receive antenna and the Prospecting Point forms a "receive propagation line" to define an angle with the ground at the Prospecting Point. This angle is the angle of reflection.

During a Read Cycle, transmit and receive antennas are substantially stationary (except for rotations in a plane to ascertain the received polarization state as described above) and maintain a fixed Incidence Station. The transmit antenna, in the far-field, is positioned along the transmit propagation line, while the receive antenna (which may or may not be in the far-field) is positioned along the receive propagation line. Changes in transmitted wave polarization are effected by discrete rotations of the transmit antenna in a plane perpendicular to the transmit propagation line; measurement of the reflected wave polarization is effected by discrete rotations of the receive antenna in a plane perpendicular to the receive propagation line.

As set forth above, the angle of incidence and angle of reflection are maintained substantially equal to one another during the Read Cycle. The system is programmed to incrementally vary the angle of incidence and angle of reflection at a single position. The system is likewise caused to incrementally revolve 360° about the Centerline. Thus the antenna system is incrementally positioned around the Centerline for each angle of incidence/reflection. It will be realized by the skilled artisan that the system can vary the angle of incidence and angle of reflection at a single station; or, revolve the platform about the Centerline for each angle of incidence and angle of reflection. That is, the order of sequencing makes no difference.

In one embodiment, at each Incidence Station a specified set of frequencies is emitted and/or received at time intervals set so as to avoid the Ionosphere effect, as further discussed below. As set forth above, the far-field polarization of the transmitted electromagnetic waves is changed by rotation of the transmit antenna within a plane defined by perpendicularity to the transmit propagation line, and the reflected wave polarization is measured by rotation of the receive antenna within a plane defined by perpendicularity to the receive propagation line. Once data has been gathered, the antennas are moved to the next stationary position (Incidence Station) about the Prospecting Point and the next reading is taken.

By revolving the transmitting and receiving antennas 360° about the Centerline as the angle of incidence and angle of reflection are varied, and repeating the measurement process, over a specified set of frequencies using both "s" and "p" transmit polarizations, a three-dimensional map of the subterranean stratigraphy can be suitably generated along with identification of geological compositions of the strata. These three-dimensional topologies about a Prospecting Point employ "p" polarized and "s" polarized waves respectively, as set forth above, but any two polarizations that form a basis for all possible polarizations (e.g. "p" polarization and a left-circular polarization) may be used.

By placement of the transmit antenna systems in the far-field the strength of the induction fields is smaller than strength of the radiation fields. It is known that those electromagnetic fields that decay as $1/r^2$ (where r is the distance from the geodetic center of the antenna) and that collectively carry no energy away from the source are referred to as induction fields; while those electromagnetic fields that decay as $1/r$ (where r is the distance from the geodetic center of the antenna) and that collectively carry energy away from the source are referred to as radiation fields. Thus, a region of space close enough to a transmitting antenna so that the strength of the induction fields is larger than strength of the radiation fields is designated herein as the "near field"; whereas, the region of space far enough away from a transmit antenna so that the strength of the induction fields not larger than strength of the radiation fields is referred to herein as the "far-field". The transmit antenna and the receive antenna are born upon appropriate aerial platforms, as further described below, to obtain sufficient distance between the antenna system and the Prospecting Point and to maintain the transmit antenna in the far-field.

Advantageously, for example, the system employs at least two, tandem pairs, of stationary aerial delivery platforms which allow stationary positioning of a line transmit and a line receive antenna. Both the transmit and receive antennas are positioned in three-dimensional space relative to the Prospecting Point and each other, as previously described, by, for example, coordinated, unmanned aerial vehicles. The receive antenna and the transmit antenna are configured at an Incidence Station, which by definition has the transmit antenna located in the far-field of the Prospecting Point, while a Read Cycle is initiated. Thus, distinct from other current aerial prospecting methods, the method described herein depends on the antennas being held substantially stationary and in strict spatial relationship with each other and the Prospecting Point while the Read Cycle is occurring and data (Read Cycle Data Record) is being gathered.

Advantageously, the receive antenna is located a considerable distance from the transmit antenna, but the exact relative location and geometry of the transmit antenna and receive antenna may be systematically varied to enhance the amount of subterranean information extracted within the parameters of the system. The receive antenna and apparatus detect and record the intensity and polarization of the return wave for two different transmitted polarizations ("s" and "p"). In accordance with known theories of the interaction of electromagnetic waves with ponderous media, the intensity and polarization of the returned wave carries information about the thickness as well as the composition of the subterranean strata of the Earth.

As discussed above, a specified set of frequencies for the emitted electromagnetic wave is used at each Incidence Station to vary the depth of penetration in the Earth's surface using the principles of "skin-depth theory." In one aspect, the mapping is accomplished in a layered fashion by transmission of polarized plane waves of progressively higher wavelengths, such that the higher frequency waves penetrate to, and are reflected in the shallow features; and, the waves of longer wavelength penetrate to, and reflect in, the deep features. Thus, as a Read Cycle Data Record is collected at a each Incidence Station, the system works in layered manner—mapping the near surface using higher frequencies and the deeper subterranean with lower frequencies. The information gathered is used in a recursive fashion to reconstruct (map) subterranean strata to a working depth.

Since the lower-frequency transmitted wave penetrates deeper into the Earth than a higher-frequency wave, the frequency of the transmitted wave is ratcheted downward as measurements proceed. By using skin-depth relationships in analyzing the data the resultant information can thus be processed in a "wedding cake" (layered) fashion, starting with measurements from the high frequency probes and proceeding to the low frequency data. The subterranean structure and composition of the Earth is found by suitable algorithmic processing of the data which is described below.

As mentioned above, in one aspect, the transmit and/or receive durations are limited such that only waves reflected from the Earth's crust are registered, and no waves attributable to reflection from the Ionosphere are received. The system, as further described, accounts for the frequency/time duality imposed by finite duration signals. In other words, the system does not resolve deep features to the same detail that it resolves shallow features.

In a further aspect, contrary to some prior art methods, the instant method focuses on the steady, repeatable part of the received signal generated by repeated transmit of identical probe signals, e.g., if the same probing signal is sent out twice, any differences in the received signals are attributed to unwanted noise. Thus, over time the noise can be averaged, or otherwise filtered out and discarded. This leads to more accurate reconstruction of the subterranean stratigraphy.

The following is by way of explanation and not limitation, and is provided herein solely to provide the skilled artisan with background and increased understanding of the method and system described herein. In a plane wave, both the electric and magnetic fields are transverse to the direction of wave travel, and both varying harmonically in time and space. The physics of the transmission, propagation, and interaction with ponderous media of plane waves allows an understanding by the skilled artisan of the workings of the system and allows manipulation for specific applications.

It is well known that when a propagating plane wave encounters a boundary between two mediums that have differing refractive indices, both transmission and reflection occur. This is shown in FIG. 1. The plane defined by propagation vector $\vec{k}$ and the unit normal to the interface between the two mediums is the plane-of-incidence. Simple kinematics dictates the angle of incidence, $\Theta_i$, and the angle of reflection, $\Theta_r$, are the same, and all three beams (incident, reflected, and transmitted) must lie in the plane-of-incidence. Additionally, the angle of refraction and the angle of incidence are related by Snell's Law.

Figure 2:
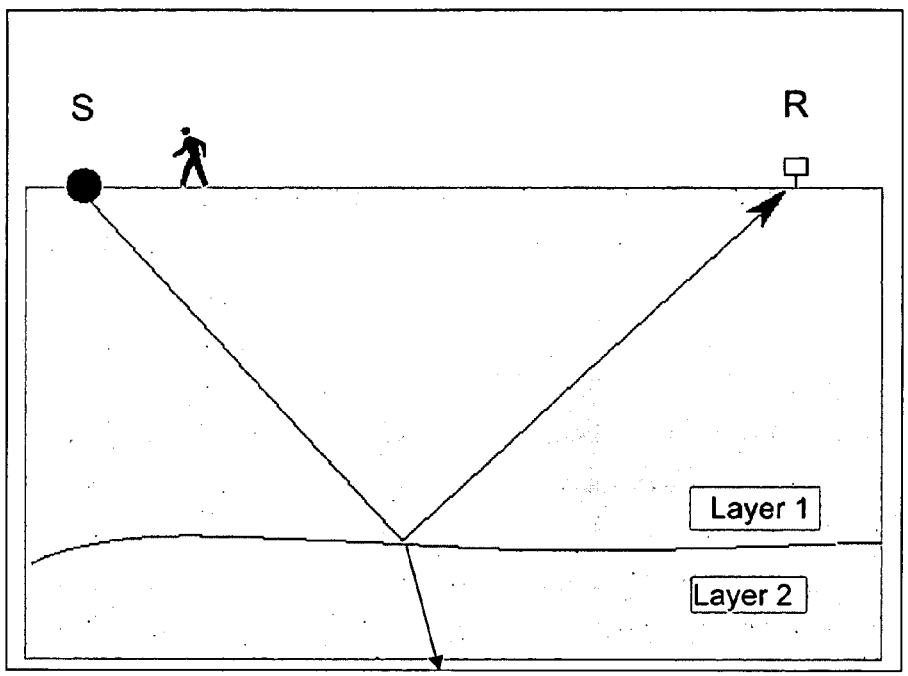
FIG. 2 depicts a plane wave reflecting off of a subterranean interface.

The above described behavior of plane waves at interfaces may be used to locate such interfaces beneath the Earth's surface as shown in FIG. 2. As shown in FIG. 2, a "one layer reflection," a plane wave is generated at point "S" and propagates into the Earth. It encounters an interface between two different materials, such as, for example, differing rock layers, and a reflected wave is generated which is received at point "R". If no interface exists, no signal is received at "R".

Figure 3:
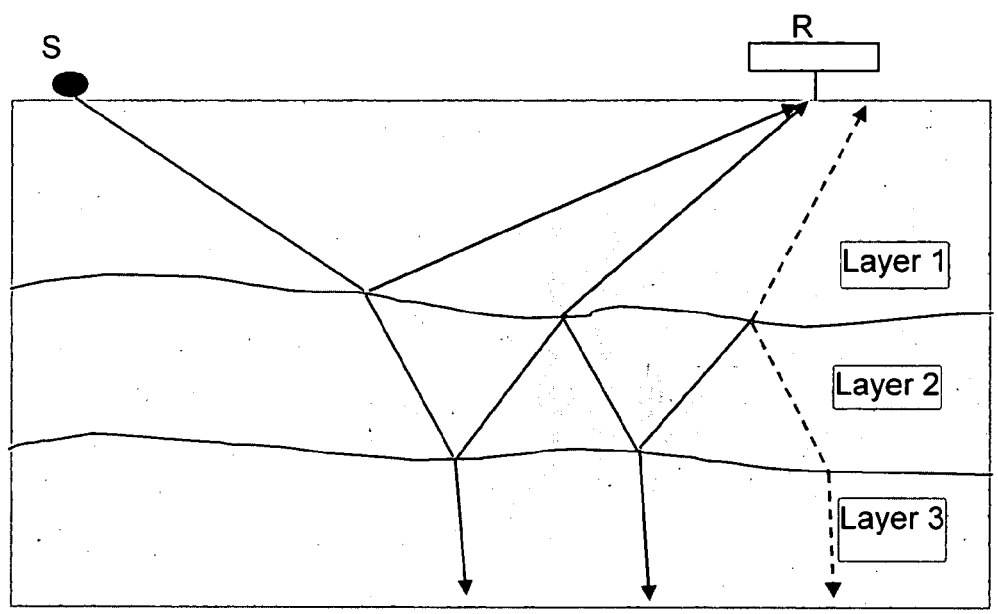
FIG. 3 depicts plane wave interacting with two subterranean interfaces having a boundary.

Behavior for multi layers follows a similar scheme. For example, three layers are shown in FIG. 3. There is, theoretically, an infinite progression of reflections and transmissions. However, practically, due to the skin-depth and penetration properties of plane waves, as described below, this infinite progression can be neglected as the wave is completely absorbed and extinguished after a relatively small number of reflections.

Skin-Depth and Penetration

As set forth above, one of the salient aspects of plane waves is how they behave in conductive materials. In a conductive material, a plane wave is attenuated (absorbed) as it travels. The degree of absorption can be described by the skin-depth, $\delta$, which is defined as the distance it takes for the wave to lose approximately 63% of its energy. Analysis shows that $$\delta = \frac{1}{\alpha} = \frac{1}{\omega\sqrt{\mu\varepsilon}} \left[ \frac{2}{\sqrt{1 + \left(\frac{\sigma}{\omega\varepsilon}\right)^2} - 1} \right]^{1/2}$$

where $$\beta = \omega\sqrt{\mu\varepsilon}\left[\frac{\sqrt{1+\left(\frac{\sigma}{\omega\varepsilon}\right)^2}+1}{2}\right]^{1/2} \text{ and } \alpha = \omega\sqrt{\mu\varepsilon}\left[\frac{\sqrt{1+\left(\frac{\sigma}{\omega\varepsilon}\right)^2}-1}{2}\right]^{1/2}$$

$\varepsilon$ is a dielectric, $\mu$ is a magnetic permeability, $\sigma$ is a conductivity. The quantities, $\varepsilon$, $\mu$, and $\sigma$ can all depend on the frequency, $\omega$.

Materials with small skin-depths absorb waves readily while materials with large skin-depth are not very absorptive.

Figure 4:
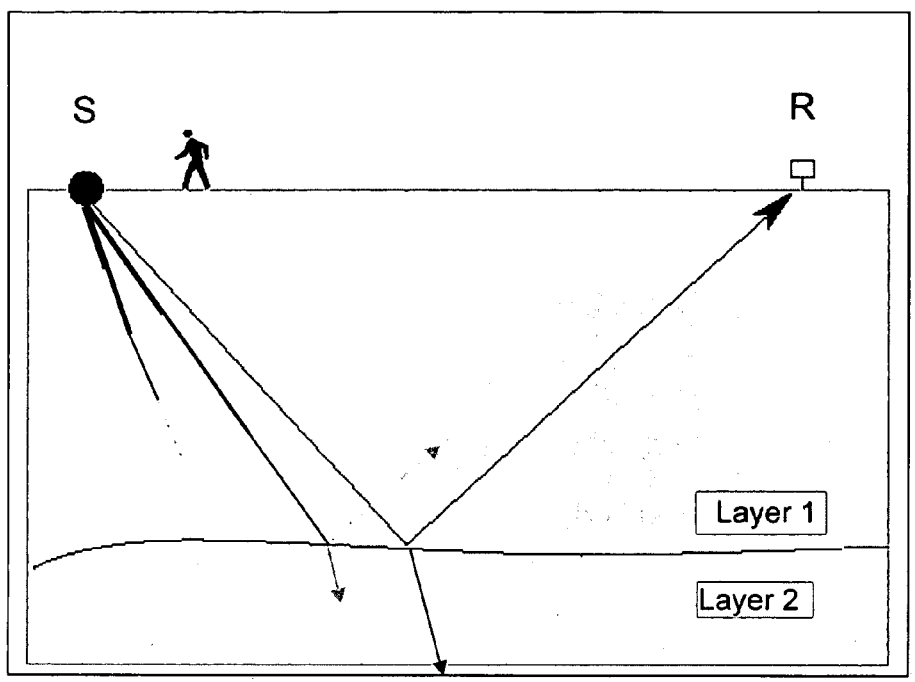
FIG. 4 depicts plane waves of differing frequencies interacting with two subterranean interfaces having a boundary.

Thus, plane waves of higher frequency (i.e. smaller wavelength) are more quickly absorbed, and do not propagate as far, into any given (conductive) material. This is shown in FIG. 4 which shows three plane waves of differing frequencies penetrating the Earth's surface. From left to right in the figure, the frequency of the wave decreases. The left-most wave of the highest frequency, is completely extinguished in Layer 1. The middle wave, of intermediate frequency, makes it to the Layer 1/Layer 2 interface and generates a reflected and refracted wave, but both are absorbed before they can interact again or reach the surface. Only the right-most (lowest frequency) wave, leaving point "S", interacts with the Layer 1/Layer 2 interface and reaches the receive antenna.

Thus, the probe depth can be adjusted by adjusting the frequency of the transmitted wave. Again, lower frequencies penetrate deeper and thus interact deeper in the Earth before returning to a receiver. Though $\epsilon$ and $\sigma$ can in fact vary over frequency for many materials however the ratio $\sigma/\omega\epsilon$ is generally fairly constant with frequency. Table 1 below gives material parameters and resulting skin-depths for some interesting materials at the frequencies of 500 Hz and 2 KHz.

TABLE 1

Approximate Skin-Depths of Various Materials at 500 Hz and 2 KHz

| Material | $\epsilon/\epsilon_0$ | $\mu/\mu_0$ | $\sigma/\omega\epsilon$ | $\delta$ (500 Hz) | $\delta$ (2 KHz) |
|---|---|---|---|---|---|
| Dry Soil | 2.8 | ≈1.0 | 0.07 | 1632 meters | 408 meters |
| Sea Water | 80 | ≈1.0 | 4 | 8.5 meters | 2 meters |
| Quartz | 3.8 | ≈1.0 | .0075 | 67000 meters | 16000 meters |

Polarization of Electromagnetic Waves

Figure 5:
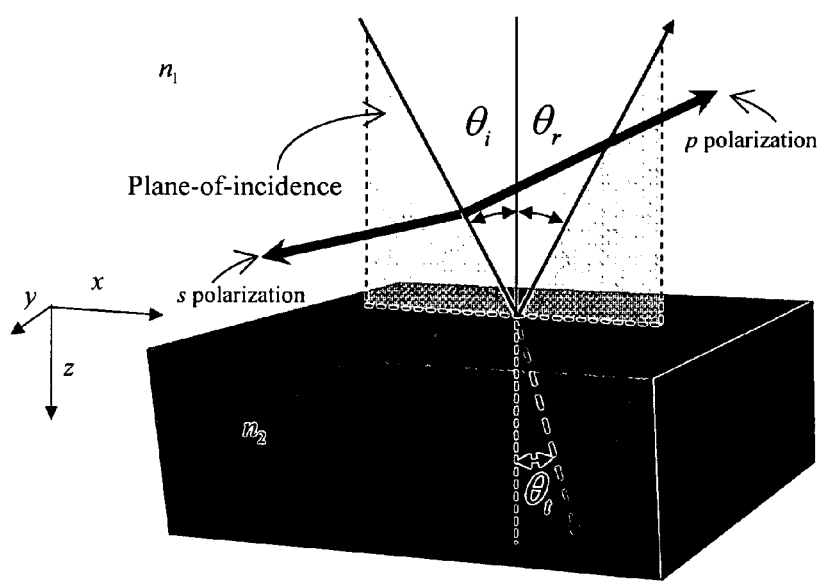
FIG. 5 depicts polarization states of a plane wave incident on a media boundary.

Electromagnetic waves of all frequencies can be polarized in a manner similar to visible light, both in and out of the plane of propagation. The electric vector $E_0$ is the vector giving the electric field at time t=0. $E_0$ must be transverse to the propagation direction. In an isotropic material, this leaves a two-dimensional plane in which $E_0$ can exist. The totality of orientations for $E_0$ can be described mathematically as a superposition of two distinctive cases, called "p" polarization, and "s" polarization respectively. As shown in FIG. 5, a plane wave in the "p" polarization state has $E_0$ lined up in the plane-of-incidence; a plane wave in the "s" polarization state has $E_0$ perpendicular to the plane-of-incidence. It is known that the reflection and refracted properties of the wave differ between the "s" and "p" polarization states. For example, for isotropic, non-conducting media, the "s" and "p" reflection coefficients are $$R_s = \frac{n_1\cos(\Theta_i) - n_2\cos(\Theta_t)}{n_1\cos(\Theta_i) + n_2\cos(\Theta_t)}$$

$$R_p = \frac{n_2\cos(\Theta_i) - n_1\cos(\Theta_t)}{n_2\cos(\Theta_i) + n_1\cos(\Theta_t)}$$

which shows differing reflection amounts depending on whether the incident wave is "s" or "p" polarized.

Ellipsometry

In ellipsometry, measurements of $\Delta$ (the phase difference between the "p" and "s" reflected wave), and tan $\psi$ (the ratio of the magnitudes of the "p" and "s" reflected wave) are made. This allows one, by well-known relationships, to determine $R_p/R_s$. When the measurements are done at a multitude of frequencies and a known angle of incidence, $\Theta_i$, then relationships between $R_p$, $R_s$ and the properties of the material allow one to determine what material the wave reflected from. In this way, subterranean geological compositions can be suitably determined.

Ionospheric Effects

Figure 6:
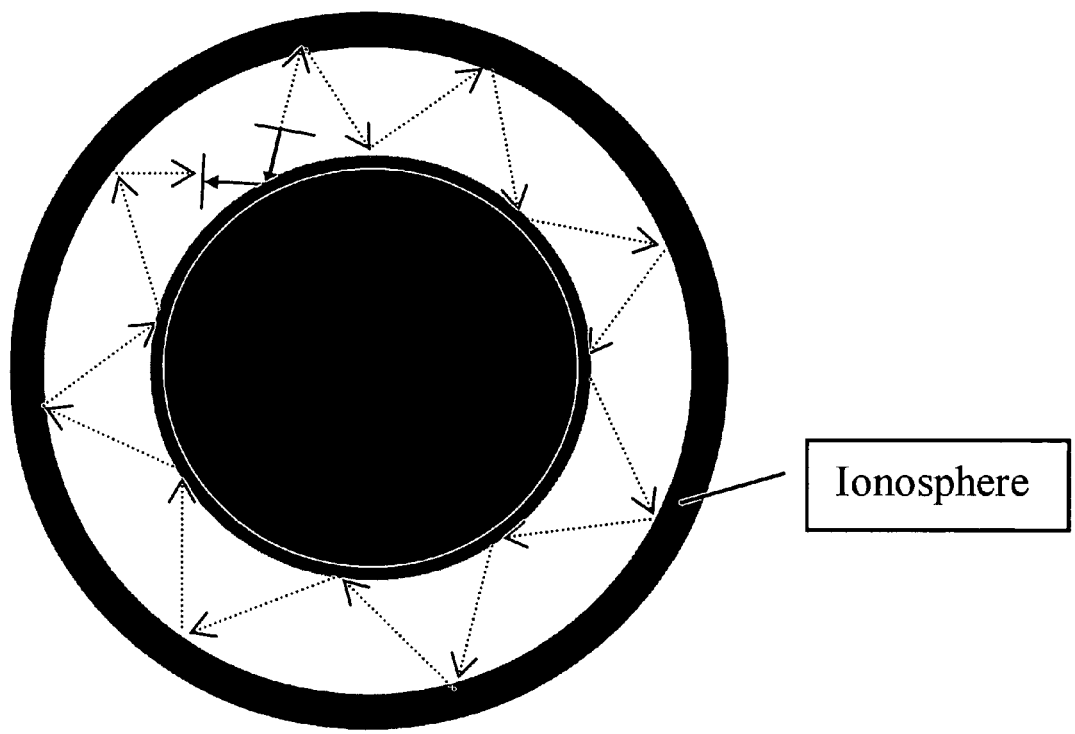
FIG. 6 depicts the resonant cavity formed by the earth and ionosphere.

Due to a conductive layer in the atmosphere called the Ionosphere, the surface of the Earth is actually one side of a resonant cavity, or wave-guide. Electromagnetic radiation emitted in the atmosphere traveling toward space (away from the Earth's surface) undergoes reflection at the Ionosphere boundary, as shown in FIG. 6. During daylight hours, the Ionosphere begins about 100 km (60 miles) above the surface of the Earth and the peak conductivity region is about 200 km above the Earth. During evening hours, after the sun has set, the beginning of the Ionosphere migrates upward to 270 km. During times of solar flares or storms, the properties and location of the Ionosphere can change quite markedly.

The existence of the Ionosphere has implications for any active electromagnetic-based geophysical prospecting system. It means that an electromagnetic wave generated on the surface or in the Earth or in the air above the surface eventually energizes the Earth-Ionosphere wave guide. An antenna will receive the wave reflected from the Earth's surface, but eventually receive the result of the wave traveling around in the Earth-Ionosphere wave guide.

If the whole Earth-Ionosphere cavity is energized by a transmitted geophysical electromagnetic probe signal, then the received signal carries not only signature of the Earth's crust, but also the signature of the Ionosphere. The Ionosphere is continually, and chaotically, changing its electrical properties due to influence of the solar wind and other factors, so having ionospheric reflections in a received signal places uncertainty in the reading and is undesirable. Because the Ionosphere is unsteady and random, reflections from it are unsteady and random. Hence, if an active electromagnetic exploration method allows these reflections to be received, the recorded data will be unsteady and random.

Minimizing Ionospheric Effects by Suitable Control

In accordance with the instant system, reflections from the Ionosphere are avoided by: suitably controlling the time duration of the transmitted pulse, suitably restricting the receive duration for the received waveform, or synthetically windowing the data offline during processing of the data as a function of transmission sequencing.

In the evening hours, for example, the electromagnetic wave sent from the system will travel to the Ionosphere, reflect, and return in a finite time:

$$\frac{270\text{ km}}{c} = \frac{270}{300,000} \approx 850 \text{ milliseconds}$$

so there is about T=850 milliseconds before reflections from the Ionosphere mix into the data. In accordance with one aspect, night prospecting is advantageous as the Ionosphere is higher, and so longer transmit/receive times are available.

Frequency/Time Duality of Signals

According to Fourier Transform theory, any function of time (periodic or not) can be represented as a superposition of sinusoids and cosinusoids. The sinusoidal pulse of finite $$\text{duration} \begin{array}{ll} 0 & \text{for } t < 0 \\ \sin(\omega_0 t) & \text{for } 0 \le t \le T \\ 0 & \text{for } t > T \end{array}$$

has the Fourier Transform $$e^{j\frac{\pi-\omega T}{2}}\left[e^{-j\frac{\omega_0 T}{2}}\frac{\sin((\omega+\omega_0)T)}{\omega+\omega_0} - e^{j\frac{\omega_0 T}{2}}\frac{\sin((\omega-\omega_0)T)}{\omega-\omega_0}\right]$$

The above equation shows that a finite duration sinusoid actually contains multiple frequencies. The range of contained frequencies spreads out as the duration of the pulse becomes shorter. We can sum this up by saying that the shorter the duration of a signal, the more frequencies it must contain. This mathematical fact, called "frequency/time duality", has implications for the instant system.

Prospecting Implication of Frequency/Time Duality

At the half-power point, a sinusoidal pulse of duration of $$T = \frac{850}{2} \text{ msec,}$$

has a frequency spread (in Hz) of $[f_0-2.3529\ f_0=2.3529]$. The "uncertainty" $\Delta f=4.718$ Hz in the sinusoidal pulse limits resolution at deeper depths. Effects can be summed up by the plot in FIG. 9.

Figure 9:
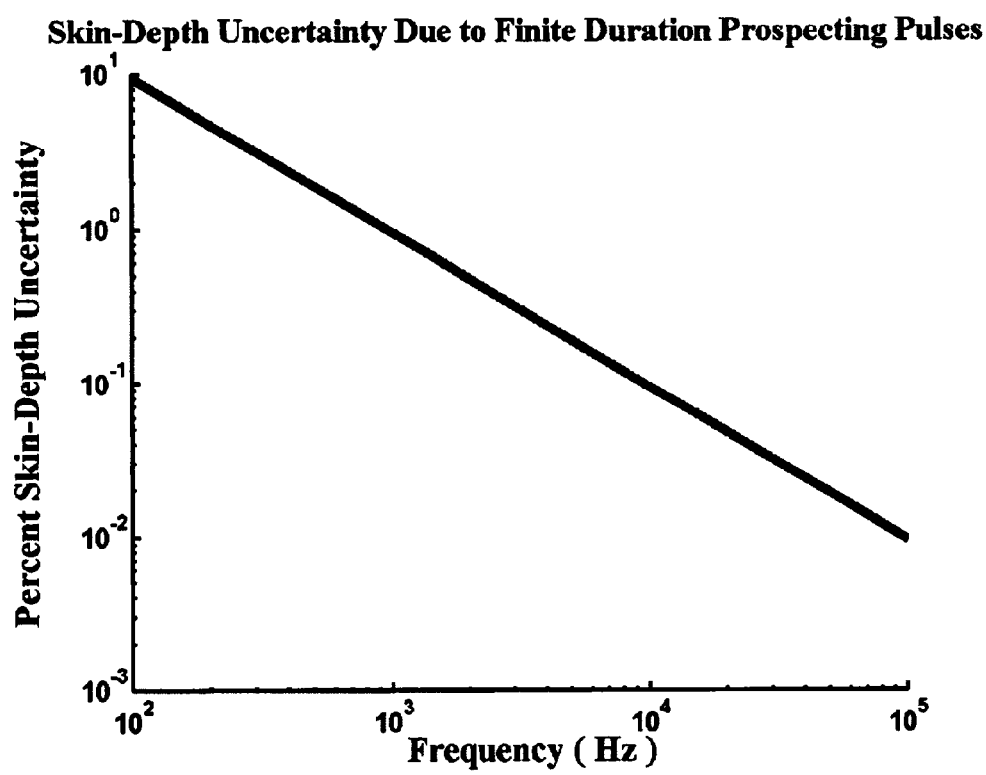
FIG. 9 depicts Skin-Depth Uncertaintyfor Finite Duration Sinusoidal Pulse Probe Signal.

FIG. 9 shows that the resolution becomes less as one progresses deeper into the Earth. This relationship allows analysis of the data received in the instant method and is predicated upon finite time active prospecting methods that avoid Ionosphere interactions.

For example, Table 1 above shows that in dry rich soil a 500 Hz wave probes to about 1.6 Kilometers. FIG. 9 shows that at 500 Hz, there will be about a 2% uncertainty in the skin-depth. Thus, any features uncovered by the 500 Hz data can only be located to within ±32 meters within the Earth's crust.

Antennas

The antennas that are useful include those giving a definite linear polarization in the far-field, and at least one plane of symmetry. Any antenna that has two (or more) orthogonal planes of symmetry, and generates radiation fields with a linear far-field polarization parallel with one of the planes is useful. Examples of such antennas, without limitation, include all line antennas (including top-loaded line antennas), all loop antennas, all plane-symmetric line antenna arrays, and all plane-symmetric loop antenna arrays, biconical antennas, horn antennas and the duals of these antennas in the form of apertures and synthetic apertures.

The behavior of an antenna may be partially described by its radiation pattern. The radiation pattern describes the intensity of the electric and magnetic fields as a function of the spherical coordinates $(\theta, \phi)$ where $\phi$ is the azimuthal angle and $\theta$ is the altitude angle. The distance coordinate, r, is not included since the pattern is intended to show the directional behavior of the antenna and radiation fields fall off in a ratio of 1/r so the behavior with r is always known and implied.

Line Antennas

Advantageously, line antennas are used in accordance with one aspect of the system. Simple line antennas are the easiest to mount on an aerial platform, and they meet requirements to be useful. The far-fields of a small line antenna are $$B = \vec{e}_\phi j \frac{I_m}{2\lambda} \sin\theta \exp[-j2\pi r/\lambda]$$

$$E = \vec{e}_\theta j \frac{I_m \eta}{2\lambda} \sin\theta \exp[-j2\pi r/\lambda]$$

where $$\lambda \stackrel{\Delta}{=} v/f = 2\pi v/\omega$$

is the generalized wavelength associated with a propagation speed of v and frequency of $\omega$ and $$\eta \stackrel{\Delta}{=} \sqrt{\mu/\varepsilon}$$

is the intrinsic impedance. Thus, the far-fields are linearly polarized.

Delivery Platform

Figure 7:
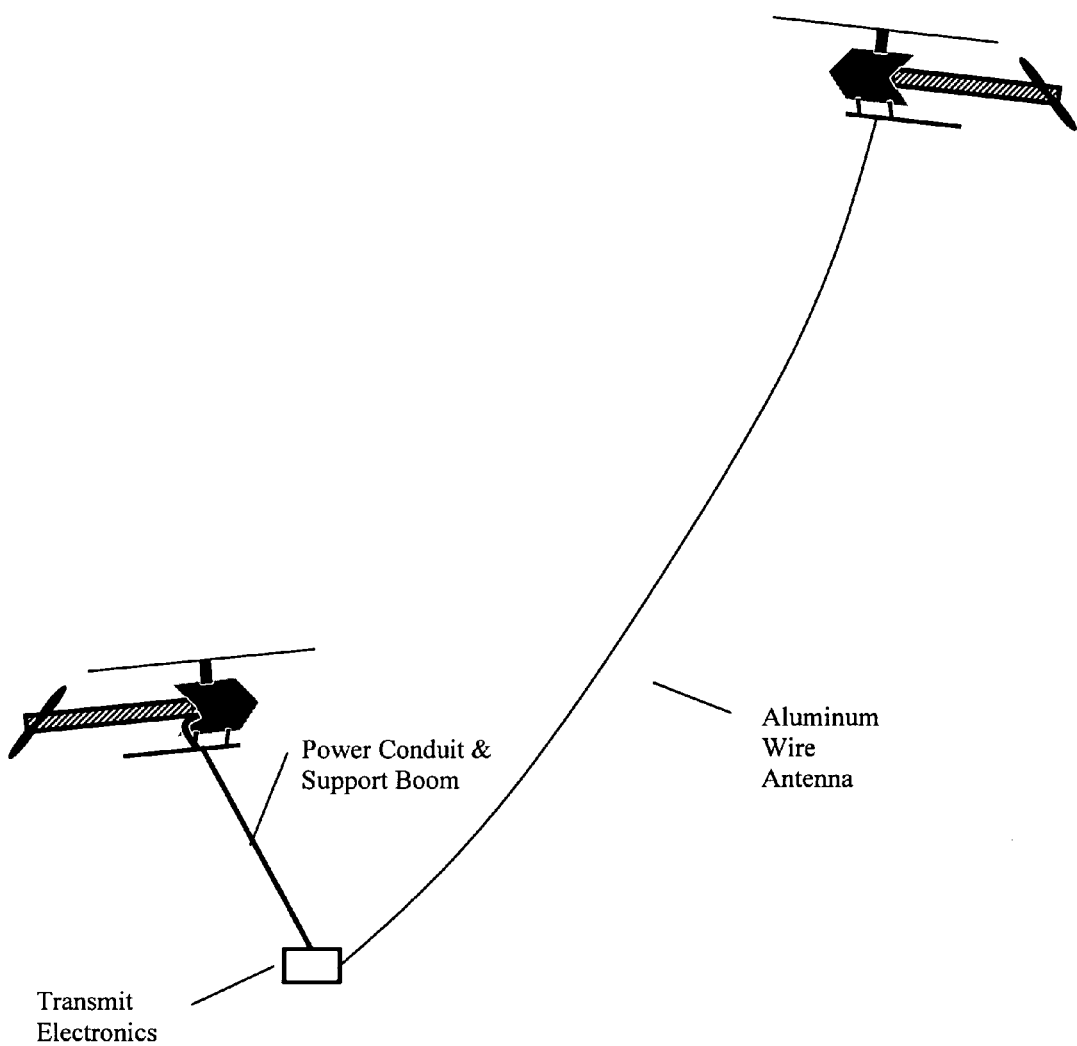
FIG. 7 depicts an exemplary transmit aerial platform system.
Figure 8:
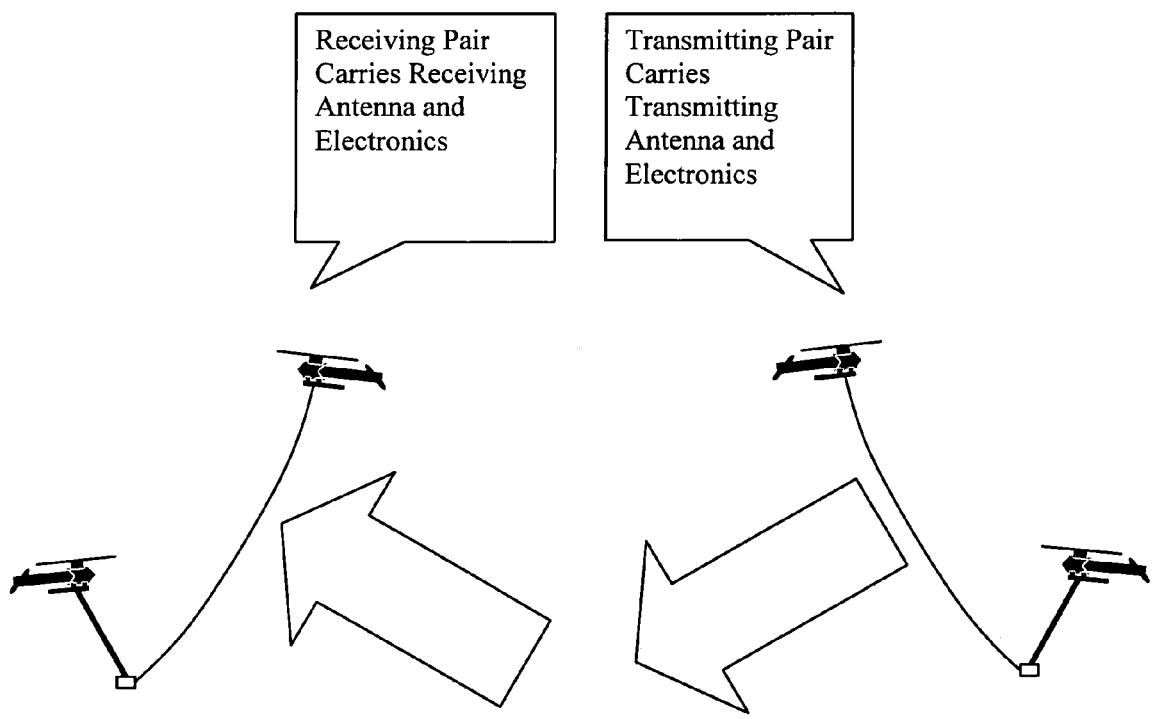
FIG. 8 depict an exemplary overall transmit/receive aerial platform system.

An exemplary delivery platform for the system is comprised of unmanned aerial vehicles ("UAV's") which carry and move the antennas and electronics during in flight maneuvers as well as hovering. For example, one pair of Radio Control ("RC") helicopters may be used to position and feed the transmitting antenna, as shown in FIG. 7. Then a second, identical, pair positions the receive antenna and electronics. An exemplary transmit/receive configuration using UAV helicopters to position line antennas is shown in FIG. 8. More complicated antenna shapes allowed by a larger number of coordinated UAV's are also possible and can be advantageous.

Without limitation, useful UAV systems may be powered helicopters of a scale of approximately 2 meters in rotor length, and approximately 2 meters in central boom length. Such craft could be powered by electric motors, which may be self contained or tethered; or, internal combustion engines, including turbines. These power plants are advantageously able to generate 4 or more breaking horsepower to allow adequate lift and maneuverability.

Control of the unmanned aerial vehicles can be accomplished by many ways known in the art. For example, UAV's may be automatically controlled by a microprocessor or other computer. Advantageously, the microprocessor or other computer will have access to GPS (Global Positioning System) information or DGPS (Differential GPS) and, possibly, ground-station generated phase correction signals, and have access to three-dimensional linear and angular acceleration measurements from an IMU (Inertial Measurement Unit). All of these measurements are used to aid in the positioning and maneuvering of the UAV in three-dimensional space. The antenna is positioned and shaped by two or more UAV's, each attached to the antenna at a different point, and each flying a specified maneuver pattern to cooperatively position and shape the antenna. In order to fly a specified maneuver pattern, the programmed prospecting run is calculated by a "master" ground-based computer system and sent via spread-spectrum (900 MHz or higher) communications to the controlling microprocessor or other computer on board each UAV.

In accordance with the operation of the instant system, a transmit antenna having a specific dimension and a receive antenna having a specific dimension are located at an Incidence Station with respect to the Prospecting Point. The antenna systems are ultimately mobile upon aerial platforms such as unmanned aerial vehicles, allowing the Incidence Station to be varied and allowing a revolution of 360° about the Centerline. The distance along the receive propagation line from the Prospect Point can be any distance but advantageously the receive antenna does not actually touch the ground.

The angle of incidence and, therefore, the angle of reflection of the transmit antenna and the receive antenna may be varied within operational limits. For example, angles of greater than 0° and less than 90° are operative. It will be realized by the skilled artisan that the aerial platform mobility and antenna configuration will limit the system and, thus, preclude certain angles. However, all angles greater than 0° and less than 90° are meant to be included within the appended claims.

Likewise, the angle of revolution about the Centerline for a given angle of incidence may be 360° In operation, the system is programmed to accomplish discrete angles of incidence as well as angles of revolution. It will be understood that the smaller the increment of incidence and/or revolution for a given set of readings, the more accurate and defined the mapping about the Prospecting Point. Likewise, the greater the discrete number of electromagnetic wave frequencies emitted for each polarization, the more accurate the definition of the subterranean geology.

It will be realized by the skilled artisan that the power or gain of the transmit antenna will effect the quality of the received information such that the higher the power or gain of the transmit antenna, the less sensitive the receive antenna has to be. In addition, it will be realized that the power or gain of the transmit antenna materially effects the signal-to-noise ratio of the system. In one aspect of the operation of the system, the affect of Ionosphere is mitigated by controlling the transmitted or received signal duration and/or synthetically windowing the data offline.

While a number of exemplary aspects and embodiments have been discussed above, those of skill in the art will recognize certain modifications, permutations, additions and sub-combinations thereof. It is, therefore, intended that the following appended claims and claims hereafter introduced are interpreted to include all such modifications, permutations, additions and sub-combinations as are within their true spirit and scope. All of the methods and systems disclosed and claimed herein can be made and executed without undue experimentation in light of the present disclosure. While the methods and systems of this invention have been described in terms of embodiments, it will be apparent to those of skill in the art that variations may be applied to the methods and systems and in the steps or in the sequence of steps of the methods described herein without departing from the concept, spirit, and scope of the invention. Various substitutions can be made to the hardware and software systems described without departing from the spirit of the claimed invention. All such similar substitutes and modifications apparent to those skilled in the art are deemed to be within the spirit, scope, and concept of the claimed invention.

What is claimed is:

1. A system for determining the physical characteristics and geological composition of subterranean formations comprising:
   at least one movable transmit antenna in the far-field of a prospecting point capable of being held stationary at an incidence station during transmission, wherein said incidence station has an angle of incidence which results in other than normal incidence, and capable of transmitting electromagnetic waves of a transmit explicit polarization state with said polarization state depending upon the transmit antenna's orientation and at varying specific frequencies wherein the transmit antenna is capable of rotation in a plane orthogonal to a transmit propagation line;
   at least one movable receive antenna, capable of receiving electromagnetic waves reflected from said subterranean formations of a receive explicit polarization state with said polarization state depending upon the receive antenna's orientation, and at said varying specific frequencies and capable of being held stationary at said incidence station during reception, wherein the receive antenna is capable of rotation in a plane orthogonal to a receive propagation line;
   means for transmitting said electromagnetic waves of said transmit explicit polarization state at said varying specific frequencies from said transmit antenna;
   means for receiving reflected electromagnetic waves of said receive explicit polarization state at said specific frequencies from said receive antenna as data; and,
   means for manipulating said data such that the differences in intensity and polarization state between the transmitted and the received electromagnetic waves of varying specific frequencies at said explicit polarization states are used to map subterranean topology and identify geologic composition of the layers to determine the physical characteristics and geological composition of subterranean formations.

2. The system of claim 1 further comprising means for positioning said transmit antenna and said receive antenna to affect at least two angles of incidence and reflection.

3. The system of claim 1 further comprising means for positioning said transmit antenna and said receive antenna to affect at least two angles of revolution about a centerline.

4. The system of claim 1 wherein said transmit antenna and said receive antenna are line antennas each separately suspended between two aerial, maneuverable platforms.

5. The system of claim 1 wherein repeatable data is retained and non-repeatable data is excluded.

6. The system of claim 1 further comprising a frequency/time duality for not resolving deep features to the same detail as shallow features.

7. The system of claim 1 further comprising means for controlling said emitting means and/or said receiving means and/or for processing said data effective to reduce ionospheric affects.

8. A method for determining the physical characteristics and geological composition of subterranean formations comprising the steps of:
   transmitting, from a mobile transmit antenna, held stationary at an incidence, station during transmission, wherein said incidence station has an angle of incidence which results in other than normal incidence, electromagnetic waves in at least one frequency and at least two distinct far-field polarization states wherein said polarization states depend upon the transmit antenna's orientation;

receiving, at a mobile receive antenna, held stationary at an incidence station during reception, electromagnetic waves reflected from said subterranean formations in at least said one frequency and said at least two distinct polarization states wherein said polarization states depend upon the transmit antenna's orientation as data; and manipulating said data such that the differences in intensity and said polarization states between the transmitted and the received electromagnetic waves of varying specified frequencies at explicit polarization states are used to map subterranean topology and identify geologic composition of the layers to determine the physical characteristics and geological composition of subterranean formations.

9. The method of claim 8 comprising the further step of varying said incidence station by varying the angle of revolution about the centerline.

10. The method of claim 8 wherein repeatable data is retained and non-repeatable data is excluded.

11. The method of claim 8 comprising the further step of employing a frequency/time duality for not resolving deep features to the same detail as shallow features.

12. The method of claim 8 wherein said transmit antenna and said receive antenna are line antennas each separately suspended between two aerial, maneuverable platforms.

13. The method of claim 8 wherein for each configuration within a plane orthogonal to the transmit propagation line required of the transmit antenna to transmit a polarized electromagnetic wave, the receive antenna rotates in a plane orthogonal to the receive propagation line such that the intensity, and the polarization state of the received reflected electromagnetic wave are ascertained.

14. The method of claim 8 comprising the further step of varying said incidence station by varying the angle of incidence.

15. The method of claim 8 further comprising the step of controlling said transmitted or received electromagnetic wave pulses and/or processing said data to minimize ionospheric affects.

16. A system for determining subsurface strata thicknesses and chemical compositions associated with changes in intensity and polarization of transmitted and received electromagnetic waves at varying, specific frequencies comprising:

means for transmitting, in the far-field, polarized electromagnetic waves at varying specific frequencies from an elevated, and specifically oriented and positioned, spatial antenna system about a prospecting point in an incidence station that has an angle of incidence which results in other than normal incidence;

means for receiving polarized electromagnetic waves reflected from said subsurface strata of an explicit polarization state of varying specific frequencies from an elevated, and specifically oriented and positioned, spatial antenna system about a prospecting point as data; and means for manipulating said data such that the changes in intensity and polarization of received electromagnetic waves at varing, specific frequencies are used to obtain a three-dimensional stratigraphy and geological layer composition of subterranean formations.

17. The system of claim 16 further comprising transmitting in a set of prospecting frequencies at two or more angles of incidence and reflection and two or more angles of revolution about a centerline.

18. The system of claim 16 further comprising a frequency/time duality for not resolving deep features to the same detail as shallow features.

19. The system of claim 16 wherein repeatable data is retained and non-repeatable data is excluded.

20. The system of claim 16 wherein for each configuration within a plane orthogonal to the transmit propagation line required of the transmit antenna to transmit a polarized electromagnetic wave, the receive antenna rotates in a plane orthogonal to the receive propagation line such that the intensity and the polarization state of the received pulse is ascertained.

21. The system of claim 16 wherein said specific frequencies range from about 30 Hz to 800 KHz.

22. The system of claim 16 wherein the antenna system is a line antenna system comprising a transmit line antenna and a receive line antenna, each separately suspended between two aerial platforms.

23. The system of claim 16 wherein the ionospheric effect is mitigated by regulating the transmit duration, and/or the receive duration and or/data manipulation as a function of a transmission timeline.

24. A system for determining the physical characteristics and geological composition of subterranean formations comprising:

a) at least one movable transmit antenna, positioned in the far-field of a prospecting point, wherein said movable transmit antenna is capable of
  i) transmitting electromagnetic waves at specified frequencies,
  ii) transmitting waves of a transmit explicit polarization state wherein said polarization state depends on the orientation of said transmit antenna, and
  iii) being held stationary at an incidence station during transmission wherein said transmit antenna is capable of rotation in a plane orthogonal to the transmit propagation line;

b) at least one movable receive antenna having a far-field polarization state that depends upon said receive antennas orientation, wherein said movable receive antenna is capable of
  i) receiving electromagnetic waves reflected from said subterranean formations at said specified frequencies; and
  ii) being held stationary at said incidence station during reception, wherein the receive antenlla is capable of rotation in a plane orthogonal to the receive propagation line;

c) means for transmitting said electromagnetic waves of transmit explicit polarization states at said varying specified frequencies from said transmit antenna;

d) means for receiving said reflected electromagnetic waves of receive explicit polarization states at said specified frequencies from said receive antenna and recording the intensity thereof versus time as receive data;

e) means for changing the transmit polarization state by rotating said movable transmit antenna in the plane orthogonal to the transmit propagation line and holding it stationary for at least one read cycle, f) means for changing the orientation of the movable receive antenna via rotation in the plane orthogonal to the receive propagation line and holding it stationary in at least two different orientations to accomplish a read cycle;

g) means for gathering a read cycle data record for each distinct read cycle; and h) means for processing said read cycle data records such that the differences in intensity and polarization state between the transmitted and received electromagnetic waves, as a function of the transmit polarization state and as a function of the said specific frequencies, are used to map subterranean topology and identify geologic composition of the layers to determine the physical characteristics and geological composition of subterranean formations.

25. The system of claim 24 wherein the transmitted electromagnetic waves and/or the received waves are limited in time and/or the read cycle data record is windowed to eliminate reflections off the ionosphere from the read cycle data record.

26. The system of claim 24 wherein said transmit antenna and said receive antenna are line antennas each separately suspended between two aerial, maneuverable platforms.

27. The system of claim 24 wherein repeatable data is retained and non-repeatable data is excluded.

28. The system of claim 24 further comprising a means to collect and process data gathered over two or more distinct angles of incidence by suitable maneuvering of the transmit and receive antennas to affect a change of incidence station.

29. The system of claim 28 further comprising a means to collect and process data gathered at two or more distinct angles of revolution about the centerline by suitable maneuvering of the movable transmit and receive antennas to affect a change of incidence station.

30. A method for mapping 3D topology and geological composition of underground strata comprising the steps of:
   a) transmitting, at least one frequency and at least two distinct far-field transmit polarization states from at least one movable transmit antenna, positioned in the far-field of a prospecting point, wherein the movable transmit antenna is capable of
      i) transmitting electromagnetic waves at specified frequencies,
      ii) being held stationary at an incidence station during transmission,
      iii) rotation in a plane orthogonal to a transmit propagation line, and
      iv) transmitting waves of transmit explicit polarization states wherein said polarization states depend on the orientation of said transmit antenna;
   b) receiving, electromagnetic waves of at least one frequency reflected from said subterranean formations to at least one movable receive antenna, wherein the movable receive antenna is capable of
      i) receiving electromagnetic waves reflected from said subterranean formations at said specified frequencies; and
      ii) being held stationary at said incidence station during reception,
      iii) rotation in a plane orthogonal to the receive propagation line, and
      iv) changing said far-field polarization states by rotation in a plane orthogonal to the receive propagation line where said reflected wave's polarization depends on the transmit antenna's orientation;
   c) systematically rotating the at least one movable receive antenna in the plane orthogonal to the receive propagation line to accomplish a read cycle;
   d) recording a read cycle data record from said movable receive antenna;
   e) identifying the change in intensity between the transmitted waves pulses and their reflections from the subterranean strata in said read cycle data record;
   f) varying said specified frequencies of transmission and the Incidence Station of the at least one transmission antenna to ascertain the change in intensity and polarization state between the transmitted electromagnetic waves and their reflections from the subterranean strata as a function of transmission frequency, transmission polarization state, angle of incidence, and revolution about the centerline, and processing said intensity and polarization state change as a function of transmission frequency, transmission polarization state, angle of incidence, and revolution about the centerline into 3D topology and physical composition of subterranean geological strata.

31. The method of claim 30 wherein higher frequencies are used to map shallower features and lower frequencies are used to map deeper features via the skin depth effect.

32. The method of claim 30 wherein repeatable data is retained and non-repeatable data is excluded.

33. The method of claim 30 wherein the transmitted electromagnetic waves and/or the received waves are limited in time and/or the Read Cycle Data Records are windowed to eliminate ionospheric effects.

34. The method of claim 30 comprising the further step of respecting frequency/time duality and not resolving deep features to the same detail as shallow features.

35. The method of claim 30 wherein said transmit antenna and said receive antenna are line antennas each separately suspended between two aerial, maneuverable platforms.

* * * * *